US008416375B2

(12) United States Patent
Oki

(10) Patent No.: US 8,416,375 B2
(45) Date of Patent: Apr. 9, 2013

(54) PROCESS OF PRODUCING LIGHT-REFLECTIVE FILM AND LIGHT-REFLECTIVE FILM

(75) Inventor: Kazuhiro Oki, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 105 days.

(21) Appl. No.: 13/172,135

(22) Filed: Jun. 29, 2011

(65) Prior Publication Data

US 2012/0002125 A1    Jan. 5, 2012

(30) Foreign Application Priority Data

Jun. 30, 2010    (JP) ................................. 2010-148672

(51) Int. Cl.
*G02F 1/1335*    (2006.01)

(52) U.S. Cl.
USPC ......................................................... 349/115

(58) Field of Classification Search .................... 349/115
See application file for complete search history.

(56) References Cited

U.S. PATENT DOCUMENTS

| | | | | |
|---|---|---|---|---|
| 5,831,694 | A | * | 11/1998 | Onisawa et al. ................ 349/43 |
| 7,652,736 | B2 | | 1/2010 | Padiyath et al. |

FOREIGN PATENT DOCUMENTS

| | | |
|---|---|---|
| JP | 2743117 | 2/1998 |
| JP | 3500127 | 12/2003 |
| JP | 3745221 | 12/2005 |
| JP | 4008358 | 9/2007 |
| JP | 4109914 | 4/2008 |
| JP | 2009-514022 | 4/2009 |
| WO | WO 2007/050433 | 5/2007 |

* cited by examiner

*Primary Examiner* — Uyen Chau N Le
*Assistant Examiner* — Chris Chu
(74) *Attorney, Agent, or Firm* — Young & Thompson

(57) ABSTRACT

A process for producing a light-reflective film is disclosed. The process comprises (a) applying a curable liquid crystal composition to a first film having a thickness of $d_1$; (b) drying the applied curable liquid crystal composition to form a cholesteric liquid crystal phase; (c) carrying out a curing reaction of the curable liquid crystal composition and fixing the cholesteric liquid crystal phase to form a lower layer; (d) repeating the set of the steps (a)-(c) three or more times on the lower layer to form a light-reflective multilayer having four or more layers of a fixed cholesteric liquid crystal phase; and (e) transferring the light-reflective multilayer, formed on the first film, onto a second film having a thickness of $d_2$ which is smaller than $d_1$;
wherein the first film, fulfilling the condition of formula (1), is used.

$$\frac{(d_1)^2 \times (Y_1)}{(d_3) \times (1 - P_1)} \geq 0.0002 \quad (1)$$

12 Claims, 1 Drawing Sheet

PROCESS OF PRODUCING LIGHT-REFLECTIVE FILM AND LIGHT-REFLECTIVE FILM

CROSS-REFERENCE TO RELATED APPLICATIONS

The present application claims the benefit of priority from Japanese Patent Application No. 2010-148672, filed on Jun. 30, 2010, the contents of which are herein incorporated by reference in their entirety.

BACKGROUND OF THE INVENTION

1. Field of the Invention

The present invention relates to a process of producing a light-reflective film having four or more light-reflective layers of a fixed cholesteric liquid crystal phase, which may be attached to windowpanes or the like. The present invention relates also to the light-reflective films produced according to the process of the present invention.

2. Background Art

With the recent increase in interest in environment and energy-related issues, the needs for energy-saving industrial products are increasing; and as one of them, glass and film are desired that are effective for heat shield for windowpanes for houses, automobiles, etc., or that is, effective for reducing heat load due to sunlight. For reducing heat load due to sunlight, it is necessary to prevent transmission of sunlight rays falling within any of the visible range or the infrared range of the sunlight spectrum. In particular, windowpanes for automobiles are required to have high transmittance of visible light from the safety viewpoint, and are additionally required to have a high level of heat shieldability. In some countries, there is a move to control Tts (total solar energy transmitted through glazing).

Laminated glass coated with a special metallic film capable of blocking out thermal radiations, which is referred to as Low-E pair glass, is often used as eco-glass having high heat-insulating/heat-shielding ability. The special metallic film may be formed by lamination of plural layers, for example, according to a vacuum-deposition method. The special metallic film formed through vacuum deposition is extremely excellent in reflectivity, but the vacuum process is nonproductive and its production cost is high. In addition, when the metallic film is used, it also blocks electromagnetic waves; and therefore in use in mobile telephones and the like, the metallic film may causes radio disturbance; or when used in automobiles, there may occur a problem in that ETC (electronic toll collection) could not be used. Not only for evading the problem of radio disturbance but also from the safety viewpoint, windowpanes for automobiles are required to have high transmittance of visible light.

There has been proposed the process employing a cholesteric liquid crystal phase. For example, as disclosed in Japanese Patent No. 4109914, a $\lambda/2$ plate, of which both surfaces have a cholesteric liquid crystal layer, can selectively and effectively reflect a unidirectional circular polarized light of a wavelength within a range of from 700 to 1200 nm.

JP-T 2009-514022 discloses an IR-reflective article having a cholesteric liquid-crystal layer. Many trials of using a laminate of plural cholesteric layers in a liquid-crystal display device have been made, and concretely, there are known many trials of efficiently reflecting a light falling within a visible light range. For example, Japanese Patent No. 3500127 discloses examples of a lamination of a lot of cholesteric layers. In the examples described in Japanese Patent No. 3500127, the lamination was produced by repeating the step of applying a cholesteric liquid-crystal material and the step of curing thereof on the alignment layer formed on the glass substrate.

In Japanese patent No. 4008358, there has been proposed a method of irradiating a liquid crystal mixture, which is disposed between two substrates, with UV rays for curing thereof, to form a broadband cholesteric liquid-crystal film. However, in the patent, there has been no method for producing any multilayered film. Japanese Patent No. 3745221 discloses a circular-polarized light extraction element having plural of liquid crystal layers, which are formed by three-dimensional crosslinking liquid crystal molecules in cholesteric regularity and are stacked in the predetermined lamination-condition. In the examples described in Japanese Patent No. 3745221, the element having a multilayered structure was produced by applying the liquid crystal material to the glass substrate according to a spin-coating method, and then three-dimensional crosslinking the liquid crystal molecules to form each of the layers.

Japanese Patent No. 2743117 discloses a method for producing an optically active element comprising a step of transferring an optically active layer formed of liquid crystal polymer on an alignment substrate onto a transparent substrate. The method, disclosed in the patent document, may achieve the weight saving and the thinning of the optically active element by transferring the optically active layer formed on the alignment substrate onto the transparent substrate, and may enhance the industrial worth of the element. In the examples described in the patent document, the optically active layer formed on the polymer film was transferred onto another polymer film having the same thickness, or onto the polymer film onto the glass substrate.

SUMMARY OF THE INVENTION

For producing light-reflective films having the high heat-shield capability, the reflected wavelength range should be widened. For obtaining the wider reflected wavelength range, light-reflective layers, of which selective reflection center wavelengths are different from each other, may be stacked to form a multilayered structure. The light-reflective film having a multilayered structure may be produced by forming each of the layers sequentially according to a coating manner or a sticking manner. According to the former method, in general, the steps of coating, drying, aligning and curing are repeated, and the step of curing may be carried out according to a photo-curing with UV irradiation. In the photo-curing, monomers are photo-polymerized to increase the molecular weight thereof, and the shrinking of the film occurs as the curing of the film is carried out. As the shrinking of the film occurs, the stress may occur in the film, and then, the stress may remain in the cured film as the internal stress, which may cause the deformation or the like of the cured film. The present inventors conducted various studies, and as a result, they found that the stress, caused by the shrinkage during the curing step of each of the layers, may accumulate inside. Especially, when the total thickness of the light-reflective multilayer, which is produced by forming each of four or more layers sequentially according to a coating manner, becomes equal to or more than 15 micro meters, the inner stress in the film as a whole becomes large remarkably, and the smoothness of the surface becomes worse. Especially, in the embodiment of the light-reflective film to be attached to windowpanes or the like, the support of the multi-layers is preferably selected from thin films in terms of the workability in the step of attaching.

However, the surface-smoothness of the light-reflective multilayer, formed on such a thin film, becomes further worse.

One object of the invention is to provide a process, including steps of coating and curing, for producing a light-reflective film, having a light-reflective four or more multilayer of a fixed cholesteric liquid crystal phase, of which total thickness is equal to or more than 15 micro meters, stably without worsening the smoothness of the surface remarkably.

Another object of the invention is to provide a light-reflective film having a good smoothness of the surface and exhibiting the broadband light-reflective characteristics.

The means for achieving the above-described objects are as follows.

[1] A process for producing a light-reflective film comprising:

(a) applying a curable liquid crystal composition to a first film having a thickness of $d_1$;

(b) drying the applied curable liquid crystal composition to form a cholesteric liquid crystal phase;

(c) carrying out a curing reaction of the curable liquid crystal composition and fixing the cholesteric liquid crystal phase to form a lower layer;

(d) repeating the set of the steps (a)-(c) three or more times on the lower layer to form a light-reflective multilayer having four or more layers of a fixed cholesteric liquid crystal phase; and (e) transferring the light-reflective multilayer, formed on the first film, onto a second film having a thickness of $d_2$ which is smaller than $d_1$;

wherein the first film, fulfilling the condition of formula (1), is used:

$$\frac{(d_1)^2 \times (Y_1)}{(d_3) \times (1 - P_1)} \geq 0.0002 \qquad (1)$$

where $d_1$ is a thickness (mm) of the first film; $Y_1$ is a Young's modulus (N/mm² at 25 degrees Celsius) of the first film; $P_1$ is a Poisson's ratio (at 25 degrees Celsius) of the first film; and $d_3$ is a total thickness (mm) of the light-reflective multilayer having four or more layers of a fixed cholesteric liquid crystal phase, where $d_3$ is equal to or more than 15 micro meters.

[2] The process of [1], wherein the deformation of the light-reflective multilayer caused by the inner stress occurring during the curing reaction in the steps (c) and (d) are reduced by using the first film fulfilling the condition of (1).

[3] The process of [1] or [2], wherein, in the step (e), the light-reflective multilayer is transferred onto the second film fulfilling the condition of formula (2):

$$\frac{(d_2)^2 \times (Y_2)}{(d_3) \times (1 - P_2)} < 0.0002 \qquad (2)$$

where $d_2$ is a thickness (mm) of the second film; $Y_2$ is a Young's modulus (N/mm² at 25 degrees Celsius) of the second film; $P_2$ is a Poisson's ratio (at 25 degrees Celsius) of the second film; and $d_3$ is a total thickness (mm) of the light-reflective multilayer having four or more layers of a fixed cholesteric liquid crystal phase, where $d_3$ is equal to or more than 15 micro meters.

[4] The process of any one of [1]-[3], wherein, in the step (e), the light-reflective multilayer is transferred onto the second film having the thickness, $d_2$, of equal to or smaller than 50 micro meters.

[5] The process of any one of [1]-[4], wherein each of the curable liquid crystal compositions to be used in the steps (a) and (d) comprises a polymerizable rod-like liquid crystal compound, an alignment-controlling agent capable of controlling the alignment of the polymerizable rod-like liquid crystal compound, and solvent.

[6] The process of any one of [1]-[5], wherein, in the steps (a) and (d), each of the curable liquid crystal compositions is applied by using a wire-bar.

[7] The process of any one of [1]-[6], which is a process for producing a light-reflective film to be used in a state being attached to a surface.

[8] The process of any one of [1]-[7], wherein at least one of the first and second films is a polyethylene terephthalate film.

[9] The process of any one of [1]-[7], wherein, in the steps (c) and (d), at least one layer capable of reflecting a right-circular polarized light and at least one layer capable of reflecting a left-circular polarized light are formed respectively.

[10] A light-reflective film produced according to a process of any one of [1]-[9], comprising:

a film having a thickness of equal to or smaller than 50 micro meters, and, thereon, a light-reflective multilayer, having four or more layers of a fixed cholesteric liquid crystal phase of a polymerizable liquid crystal composition, and the total thickness of the light-reflective multilayer being equal to or more than 15 micro meters.

[11] The light-reflective film of [10], wherein the haze value of the light-reflective multilayer is less than 0.7.

[12] The light-reflective film of [10], which is capable of reflecting 75% or more light at a wavelength of from 900 nm to 1160 nm.

According to the invention, it is possible to provide a process, including steps of coating and curing, for producing a light-reflective film, having a light-reflective four or more multilayer of a fixed cholesteric liquid crystal phase, of which total thickness is equal to or more than 15 micro meters, stably without worsening the smoothness of the surface remarkably.

According to the invention, it is possible to provide a light-reflective film having a good smoothness of the surface and exhibiting the broadband light-reflective characteristics.

Figure 1:
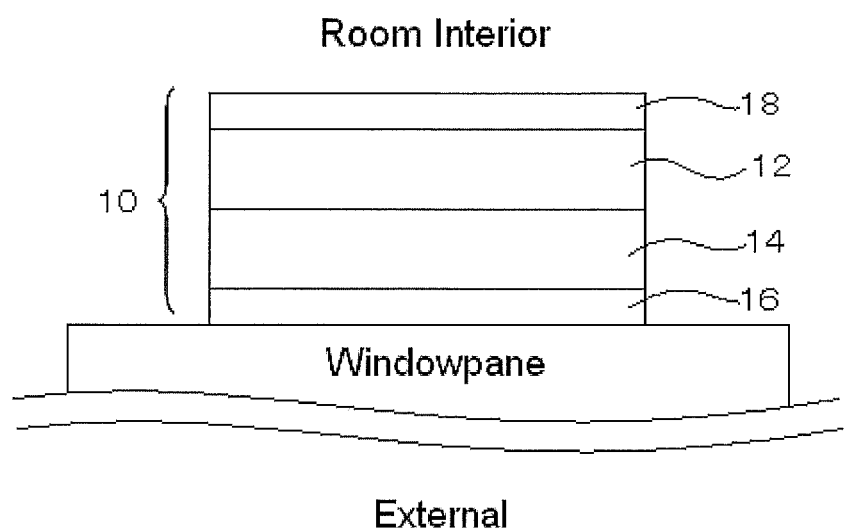
FIG. 1 is a schematic cross-sectional view of one example, which is in a state attached to a windowpane, of a light-reflective film, produced according to a process of the invention.

In the drawing, the reference numerals and signs have the following meanings.

| | |
|---|---|
| 10, 10' | Light-Reflective Film |
| 12 | Second Film |
| 14 | Light-reflective Multilayer |
| 16 | Adhesion Layer |
| 18 | Hard Coat Layer |
| 20 | Inorganic Light-reflective layer |

DETAILED DESCRIPTION OF THE INVENTION

The invention is described in detail hereinunder. In this description, the numerical range expressed by the wording "a number to another number" means the range that falls between the former number indicating the lowermost limit of the range and the latter number indicating the uppermost limit thereof.

1. Process for Producing Light-Reflective Film

The present invention relates to a process for producing a light-reflective film containing a light-reflective multilayer, having four or more layers of a fixed cholesteric liquid crystal phase of a polymerizable liquid crystal composition, of which total thickness is equal to or more than 15 micro meters. According to the prior art, the light-reflective multilayer, having the above-mentioned structure, which is produced by repeating the steps of coating and curing a polymerizable liquid crystal composition, suffered from low smoothness of the surface. The smoothness of the surface influences the light-reflective characteristics, and the desired heat-shield ability cannot be obtained. The present inventors conducted various studies, and as a result, they found that the stress, caused by the shrinkage during the curing step of each of the layers, accumulates as an inner stress and causes the deformation of the film, which results in lowering the smoothness of the surface. They found also that, in the light-reflective film having the above-mentioned structure, the influence of the inner stress, caused by the shrinkage during the curing step of each of the layers, accumulates, and the accumulation thereof lowers the surface-smoothness, which comes out as a depression of the heat-shield ability. According to the invention, by using the first film fulfilling the predetermined condition as a support, and forming the light-reflective multilayer having the above-mentioned structure on the first film, the deformation of the light-reflective multilayer caused by the inner stress occurring during the curing-reaction can be reduced. As a result, it is possible to produce a light-reflective multilayer, having the high surface-smoothness and the good heat-shield ability, in a high productivity. Furthermore, by transferring the light-reflective multilayer onto the second film of having a thickness which is smaller than that of the first film, the light-reflective film, exhibiting a good workability (for example, a good workability when the film is attached to a windowpane), can be obtained.

The process of the invention will be described in detail below.

The process of the invention comprises (a) applying a curable liquid crystal composition to a first film having a thickness of $d_1$;

(b) drying the applied curable liquid crystal composition to form a cholesteric liquid crystal phase;

(c) carrying out a curing reaction of the curable liquid crystal composition and fixing the cholesteric liquid crystal phase to form a lower layer;

(d) repeating the set of the steps (a)-(c) three or more times on the lower layer to form a light-reflective multilayer having four or more layers of a fixed cholesteric liquid crystal phase; and (e) transferring the light-reflective multilayer, formed on the first film, onto a second film having a thickness of $d_2$ which is smaller than $d_1$;

wherein the first film, fulfilling the condition of formula (1), is used:

$$\frac{(d_1)^2 \times (Y_1)}{(d_3) \times (1-P_1)} \geq 0.0002 \quad (1)$$

where $d_1$ is a thickness (mm) of the first film; $Y_1$ is a Young's modulus (N/mm² at 25 degrees Celsius) of the first film; $P_1$ is a Poisson's ratio (at 25 degrees Celsius) of the first film; and $d_3$ is a total thickness (mm) of the light-reflective multilayer having four or more layers of a fixed cholesteric liquid crystal phase, where $d_3$ is equal to or more than 15 micro meters.

According to the invention, by using the first film, having the thickness, $d_1$, and the physical properties (Young's modulus $Y_1$ and Poisson's ratio $P_1$) so as to fulfill the condition of formula (1) in relation to the total thickness, $d_3$, of the light-reflective multilayer, as a support, it is possible to produce the light-reflective multilayer having the desired thickness stably without worsening the surface-smoothness. The left part of the formula (1) is a formula for calculating an inner stress (see, for example, "Handbook of Thin Film", 4.7.2 Inner Stress). The reason of determining 0.0002 as the minimum value of formula (1) is as follows. As shown in Examples described later, the inventors conducted experiments of preparing various samples and evaluating the light-reflective characteristics and the haze thereof. Then, the samples were classified into two group; one of them is a group wherein the surface-smoothness worsened so that the depression of the light-reflective characteristics and the increase of the haze were actually recognized, and another of them is a group wherein the surface-smoothness didn't worsen at all or worsened slightly so that the depression of the light-reflective characteristics and the increase of the haze were not influenced. Studying the samples classified into the above two group, the inventors found that the critical point between the two groups was 0.0002. The value calculated with the formula of the left part is preferably equal to or more than 0.0003, or more preferably equal to or more than 0.0004. The maximum value of formula (1) may not be determined, and, considering actual materials, the maximum value may be about 0.010.

Each of the steps will be described in detail below.

Step (a):

In the step (a), a curable liquid crystal composition is applied to a first film having a thickness of $d_1$. The first film may not be limited in terms of the material thereof, so far as fulfilling the condition of formula (1). The thickness, $d_3$, of the light-reflective multilayer, having four or more layers of a fixed cholesteric liquid crystal phase and exhibiting the light-reflective characteristics for the infrared broad range or exhibiting the heat-shield characteristics, may be usually from about 15 to about 40 micro meters. In an example employing the light-reflective multilayer with the thickness $d_3$ falling within the above-described range, a polyethylene terephthalate film having a thickness, $d_1$, of from 50 to 82 micro meters, may be used as the first film. The polymer films which can be used as the first film will be described in detail later.

The curable liquid crystal composition contains at least one liquid crystal compound. The composition may contain also at least one additive such as an agent for controlling the alignment and a chiral agent for forming the cholesteric liquid crystal phase stably. The curable liquid crystal composition may be prepared as a coating liquid containing a solvent. The curable liquid crystal composition is preferably prepared as a coating liquid in which the materials are dissolved and/or dispersed in the solvent. The ingredients which can be used in the invention will be described in detail later.

In the step (a), the coating liquid of the curable liquid crystal composition may be applied to a surface of the first film or, if necessary, a surface of an alignment formed on the first film. The coating liquid may be applied according to any method such as a wire bar coating method, an extrusion coating method, a direct gravure coating method, a reverse gravure coating method, and a die coating method. The wire bar coating method is preferable as a method for forming a liquid crystal multilayer because it is excellent in the productivity and in the accuracy of the thickness in forming thin layers.

Step (b):

In the step (b), the curable liquid crystal composition is dried to form a cholesteric liquid crystal phase. In the embodiment wherein the curable liquid crystal composition is prepared as a coating liquid, the coating layer of the composition may be dried for the evaporation of the solvent to form a cholesteric liquid crystal phase. The coating layer may be heated for adjusting the temperature thereof to the transition temperature at which the transferring to the cholesteric liquid crystal phase occurs. For example, the temperature may be elevated to the isotropic phase transition temperature once, and then be cooled to the transition temperature at which the transferring to the cholesteric liquid crystal phase occurs. By controlling the temperature in such a manner, the cholesteric liquid crystal phase may be formed stably. The liquid crystal phase transition temperature of the curable liquid crystal composition is preferably from 10 to 250 degrees Celsius, or more preferably from 10 to 150 degrees Celsius, in terms of the production-adequacy. If the liquid crystal phase transition temperature is less than 10 degrees Celsius, the step of decreasing the temperature to the range, within which the liquid crystal phase is formed, may be necessary. The liquid crystal phase transition temperature of higher than 200 degrees Celsius may be unfavorable in terms of the waste of the thermal energy and the deformation or the degradation of the first film because the temperature which is higher than the liquid crystal transition temperature may be necessary for obtaining the isotropic liquid phase once.

Step (c):

In the step (c), the curing reaction of the curable liquid crystal composition is carried out so as to fix the cholesteric liquid crystal phase and form a lower layer. The curing reaction may be carried out under the irradiation of the active radiation such as UV light. In the embodiment employing UV light, a light source such as an ultraviolet lamp is used. In this step, the curing reaction of the curable liquid crystal composition is carried out so as to fix the cholesteric liquid crystal phase and form a lower layer exhibiting the selective reflectivity characteristics.

The irradiation energy of UV light is not limited, and in general, it is preferably from 100 mJ/cm$^2$ to 800 mJ/cm$^2$. The period for irradiation with UV light is not limited, and may be determined in terms of both of the sufficient strength of the cured layer and the productivity.

For promoting the curing reaction, the irradiation of UV light may be carried out under heating. The temperature is preferably maintained at the cholesteric liquid crystal phase transition temperature during the irradiation of UV light so that the cholesteric liquid crystal phase is not disordered. The oxygen concentration in the atmosphere participates in the degree of polymerization. Accordingly, in case where the cured layer could not have the intended degree of polymerization in air and the film strength is therefore insufficient, preferably, the oxygen concentration in the atmosphere is lowered according to a method of nitrogen purging or the like. The preferred oxygen concentration is at most 10%, more preferably at most 7%, most preferably at most 3%.

In the above step, the cholesteric liquid-crystal phase is fixed and the intended light-reflective layer is thereby formed. A most typical and preferred embodiment of the "fixed" liquid-crystal state is such that the alignment of the liquid-crystal compound to form the cholesteric liquid-crystal phase is held as such, to which, however, the invention is not limited. Concretely, the fixed state means that, in a temperature range of generally from 0 to 50 degrees Celsius, or from −30 to 70 degrees Celsius under a severer condition, the layer does not have flowability and does not undergo any alignment morphology change in an external field or by an external force applied thereto, and the layer can continue to stably keep the fixed alignment morphology. In the invention, the alignment state of the cholesteric liquid-crystal phase is preferably fixed through the curing reaction as carried out by ultraviolet irradiation.

In the invention, it is enough that the optical properties of the cholesteric liquid-crystal phase are held in the layer, and finally it is any more unnecessary that the liquid-crystal composition in the light-reflective layer exhibits liquid crystallinity. For example, the liquid-crystal composition may be converted to a high-molecular weight substance and may lose the liquid crystallinity.

Step (d):

In the step (d), the set of the steps (a)-(c) is repeated three or more times on the lower layer to form a light-reflective multilayer having four or more layers of a fixed cholesteric liquid crystal phase. Before carrying out the step (d), and after carrying out each of the set of the steps (a)-(c), the lower layer may be cooled to a room temperature.

By using the film fulfilling the condition of the formula (1) as a support, the layers free from the deformation caused by the inner stress can be formed sequentially. As a result, the light-reflective multilayer having good alignment characteristics and desired light-reflective characteristics can be prepared stably.

In step (d), at least a part of the alignment-control agent in the lower layer may diffuse into the upper layer. The alignment-control agent which diffuses into the upper layer may be distributed highly and localized at the air-interface of the upper layer again, and may function as an alignment-control agent of the rod-like liquid crystal compound. Examples of the alignment-control agent include compounds capable of promoting the horizontal orientation of rod-like liquid crystal molecules. In the invention, the solid content concentration of the alignment-control agent in the curable liquid crystal composition to be used for forming the upper layer is preferably equal to or smaller than the solid content concentration of the curable liquid crystal composition to be used for forming the lower layer. In the upper layer, the alignment-control agent which elutes and diffuses from the lower layer may be reused, and therefore, the solid content concentration of the alignment-control agent in the curable liquid crystal composition to be used for forming the upper layer is preferably smaller, compared with that to be used for forming the lower layer. More specifically, the solid content concentration of the alignment-control agent in the curable liquid crystal composition to be used for forming the lower layer is preferably from 0.01 to 10% by mass, more preferably from 0.01 to 5% by mass and even more preferably from 0.02 to 1% by mass. The solid content concentration of the alignment-control agent in the curable liquid crystal composition to be used for forming the upper is preferably an amount obtained by subtracting from the above-mentioned preferable amount by an amount of the agent eluted from the lower layer.

According to the invention, the degree of diffusion of the alignment-control agent from the lower layer into the upper layer may be controlled by adjusting the hardness of the lower layer. In a cured layer having a high hardness, the degree of polymerization of the polymerizable ingredient(s) in the layer is high, and the molecular network is formed rigidly. In such a cured layer, the alignment-control agent may be trapped in the network, and therefore, an amount of the alignment-control agent to elute into the upper layer may be reduced. Adjusting the hardness of the lower layer allows an appropriate amount of the alignment-control agent to elute into the upper layer. The hardness of the layer may be adjusted by an irradiation amount of active radiation in carrying out the curing reaction and/or by an amount or concentration of a polymerization initiator contained in the curable liquid crystal composition. According to an embodiment of the invention, in the (c) step, the curing reaction is carried out under a condition so as to allow a part of curable ingredient(s) in the curable liquid crystal composition not to react. As a result, the curing reaction of the lower layer is carried out incompletely, and therefore, elution and diffusion of the alignment-control agent into the upper layer is promoted. More specifically, for example, the irradiation energy amount of active radiation for the curing reaction of the lower layer in the (c) step is less than that for the curing reaction of the upper layer in the (c) step irradiation energy amount. For example, in the (c) step for the lower layer, the curing reaction is carried out with the irradiation energy amount of active radiation which is about half of that for carrying out the reaction completely. If the curing reaction is not carried out under the condition, the atmosphere may be replaced with an inactive gas such as nitrogen gas. In the embodiment in which the hardness of the lower layer is low, applying the coating liquid of the liquid crystal composition to the surface of the lower layer, the alignment-control agent localized at the surface of the lower layer may elute and diffuse into the coating liquid easily.

Although the unreacted ingredients remain in the lower layer, the curing of the unreacted ingredients in the lower layer is carried out in the (c) step for the upper layer since the curing reaction in the (c) step for the upper layer is carried out by a higher irradiation energy amount of active radiation. The curing reaction of a part of the residual unreacted ingredients in the lower layer may be carried out not only when the upper layer adjacent to the lower layer is formed but also when the active radiation is irradiated for forming the most-upper layer. According to the embodiment, the hardness of the lower layer is increased, and the lamination film excellent in the durability can be obtained. From this viewpoint, the irradiation energy amount of active radiation for at least forming the most-upper layer is preferably higher than that for forming the lower layer.

The reaction rate of the curing reaction (for example, polymerization) carried out under irradiation of the active radiation for forming the lower layer is preferably from 10 to 80%, or more preferably from 20 to 70%. The measurement of the reaction rate may be performed by comparison of the absorption intensities of the infrared vibration spectrum attributed to the reactive group such as polymerizable group.

Or, by selecting the polymerization initiator or adjusting the concentration thereof, in the (c) step, the curing reaction may be carried out under a condition so as to allow a part of curable ingredient(s) in the curable liquid crystal composition not to react. More specifically, in this embodiment, the polymerization initiators, having a high spectral sensitivity and having a rapid rate of radical-generation, are preferable. Preferable examples of such a polymerization initiator include "IRG-819" and "IRG-907" (Ciba Specialty Chemicals). "IRG-819" has a higher rate of radical-generation and can adjust the reaction rate to the appropriate range more stably, compared with "IRG-907". And using "IRG-819" is more preferable than using "IRG-907" because it allows the alignment-control agent to elute and diffuse from the lower layer into the upper layer more stably.

Or, the degree of diffusion of the alignment-control agent from the lower layer into the upper layer may be controlled by adjusting the solid content concentration of the coating liquid of the curable liquid crystal composition and/or selecting the solvent. For example, the smaller solid content concentration of the coating liquid to be used for forming the upper layer is more preferable because the elution and diffusion of the alignment-control agent from the lower layer can be promoted. In terms of the coating layer-forming, the productive efficiency or the like, the lower limit may be determined. In particular, the solid content concentration is preferably from 10 to 50%, or more preferably from 15 to 40%. The solvent is preferably selected from high-polar solvents because the alignment-control agent can be dissolved in the solvent easily. Preferable examples of the solvent include toluene, methylethylketone and N-methyl pyrolidone.

Step (e):

In the step (e), the light-reflective multilayer, formed on the first film, is transferred onto a second film having a thickness of $d_2$ which is smaller than $d_1$. By carrying out this step, it is possible to achieve the thinning of the film, which is the advantage in terms of the good workability (especially, the good workability when the film is attached to windowpanes), while it is possible to maintain the high surface smoothness and the good light-reflective characteristics. Furthermore, according to the invention, it is possible to reduce the transferring defects caused by the worsened surface-smoothness. The second film is not required to fulfill the condition of the formula (1). For example, the second film may be selected from the films fulfilling the condition of the following formula (2).

$$\frac{(d_2)^2 \times (Y_2)}{(d_3) \times (1 - P_2)} < 0.0002 \qquad (2)$$

In the formula (2), $d_2$ is a thickness (mm) of the second film; $Y_2$ is a Young's modulus (N/mm² at 25 degrees Celsius) of the second film; $P_2$ is a Poisson's ratio (at 25 degrees Celsius) of the second film; and $d_3$ is a total thickness (mm) of the light-reflective multilayer having four or more layers of a fixed cholesteric liquid crystal phase, where $d_3$ is equal to or more than 15 micro meters.

The thinner thickness $d_2$ of the second film is more preferable in terms of the workability of the light-reflective film, especially, the workability in attaching to windowpanes, and, concretely, the thickness $d_2$ of the second film is preferably from 30 to 50 micro meters. However, a very thinner film may suffer from crinkles, and therefore, the thickness of the second film is preferably from 40 to 50 micro meters.

The second film may be selected from various films having the thickness which is thinner than that of the first film. The second film may be selected from the films made of the material which is same as or different from that of the first film. The details will be described later.

The transferring step may be carried out under any condition, and may be carried out according to any known transferring method. In one embodiment, after the light-reflective multilayer, having four or more layers, is formed on the first film, the second film is attached to the light-reflective multilayer according to a thermocompression bonding, and then the first film is removed to transfer the light-reflective multilayer onto the second film. For promoting the detachment of the first film, the second film may be cooled after being subjected to the thermocompression. A long film may be used as the first film. In the embodiment employing the long film as the first film, the light-reflective multilayer, having four or more layers, is formed on the first film while the first film is fed, and allowed to pass the film between a pair of thermocompression-rolls along with the second film, thereby being attached to the second film according to a thermocompression bonding manner; and then, the first film is removed at the exit of the pair of thermocompression-rolls. In this way, the light-reflective film may be produced continuously. However, the invention is not limited to the embodiment.

2. Light-Reflective Film

By carrying out the steps (a)-(e), it is possible to produce a light-reflective film comprising a light-reflective multilayer, having four or more layers of a fixed cholesteric liquid crystal phase of a polymerizable liquid crystal composition, of which total thickness of the light-reflective multilayer is equal to or more than 15 micro meters. The light-reflective film produced according to the method of the invention exhibits selective reflectivity characteristics attributed to the cholesteric liquid crystal phase in each of the layers. The light-reflective film has both of a layer of a fixed right-twisted cholesteric liquid crystal phase and a layer of a fixed left-twisted cholesteric liquid crystal phase. The film having both of the layers of a fixed right-twisted cholesteric liquid crystal phase and a fixed left-twisted cholesteric liquid crystal phase of which helical pitches are same exhibits a high reflectance for the light of the specified wavelength, and is preferable. The film, having a plurality of the pair of the layers of a fixed right-twisted cholesteric liquid crystal phase and a fixed left-twisted cholesteric liquid crystal phase of which helical pitches are same, exhibits not only a high reflectance but also a wide selective reflectivity characteristics, and is preferable.

The twisting direction of the cholesteric liquid crystal phase may be adjusted by selecting the rod-like liquid crystal or the chiral agent; and the helical pitch may be adjusted by controlling the concentrations thereof.

The total thickness of the light-reflective multilayer is not limited. Usually, in the embodiment containing four or more layers of the fixed cholesteric liquid crystal phase and exhibiting the light-reflective characteristics for the wide infrared wavelength range or the heat-shielding characteristics, the thickness of each of the layers may be from about 3 micro meters to about 6 micro meters, and the total thickness $d_3$ of the light-reflective multilayer may be from about 15 micro meters to about 40 micro meters.

The wavelength of selective reflection wavelength of each of the layers contained in the light-reflective film is not limited. The desired reflection characteristics for light of the specified wavelength may be obtained by adjusting the helical pitch depending on the application. One example of the light-reflective film is a so-called infrared light-reflective film, containing at least one layer capable of reflecting a part of 800 nm or longer infrared light, which exhibits the heat-shield characteristics. One example of the light-reflective film according to the invention is capable of reflecting 75% or more of sunlight having a wavelength of from 900 nm to 1160 nm, or preferably 90% or more of sunlight having a wavelength of from 900 nm to 1160 nm. The window film formed of the film, showing the above characteristics, may achieve the high heat-shielding effect, and have the shielding-coefficient, defined by JIS A-5759 (films for windowpanes of constructions), of equal to or smaller than 0.7.

On the other hand, for example, if any film, not fulfilling the condition of the formula (1) and fulfilling the condition of the formula (2), is used as the first film, and the steps (a)-(d) are carried out on the film, the surface-smoothness of the light-reflective multilayer is lowered by the accumulation of the inner stress, which results in lowering the heat-shielding ability or in easily causing the transferring defects. The light-reflective film, produced by using the film not fulfilling the condition of the formula (1) and fulfilling the condition of the formula (2) as the first film, may be capable of reflecting about the most 70% of sunlight having a wavelength of from 900 nm to 1160 nm. The film, showing the above characteristics, may have the shielding-coefficient, defined by JIS A-5759 (films for windowpanes of constructions), of equal to or larger than 0.8, which is inferior as a heat-shielding film.

As described above, the surface of each of the layers of a fixed cholesteric liquid crystal phase, contained in the light-reflective film according to the invention, may maintain the high smoothness, and the alignment in the layer formed thereon may become good. Worsening the alignment causes not only the decrease of the heat-shielding ability but also the remarkable increase of the haze. In the light-reflective film according to the invention, the worsening of the alignment is prevented, and the small haze, which is concretely smaller than 0.7, may be achieved. The light-reflective film to be attached to a windowpane or the like is required to be transparent, and the smaller haze is more preferable. The haze is preferably equal to or smaller than 0.6, or more preferably equal to or smaller than 0.3. The haze value may be measured according to JIS K 7136:2000 (how to measure haze values of plastic-transparent materials).

By using a film, having a thickness of not larger than 50 micrometers, as the second film, the light-reflective film produced according to the process of the invention may become a thin film as a whole, and the workability in attaching it to windowpanes or the like may be improved. The light-reflective film according to the embodiment may be attached, as a heat-shielding film for sunlight, to any windowpanes of any constructions such as housings and office buildings or of any vehicles such as automobiles. However, the invention is not limited to the embodiment. The light-reflective film according to the present invention may be used in a state being incorporated into a laminated glass.

The ingredients which can be used in the process of the invention will be described in detail below.

(1) First and Second Films

According to the present invention, the first film which becomes a support of the light-reflective multilayer, and the second film having the thickness thinner than that of the first film, which receives the light-reflective multilayer thereon by transferring, are used. The first and second films may be made of the same polymer material or the different polymer material. The first film may be not limited in terms of the material or the optical properties so far as it can support the light-reflective multilayer. On the other hand, the second film may be required to be highly transparent in some uses. The second film may be selected from specific retardation plates such as a λ/2 plate, which are produced according to the method controlled for obtaining the specific optical properties; or the substrate may be selected from polymer films of which variation in in-plane retardation is large, more particularly, variation in Re (1000), which is in-plane retardation at a wavelength of 1000 nm, is equal to or more than 20 nm or 100 nm, which cannot be used as a specific retardation plate.

the first or second film is not limited in terms of retardation in plane, and, for example, a retarder or the like of which in-plane retardation at a wavelength of 1000 nm, Re(1000) is from 800 to 13000 nm may be used.

Polymer films having a high transmission for a visible light include those used in display devices such as a liquid crystal display device as an optical film. Preferable examples of the polymer film which can be used as a substrate include poly ester films such as polyethylene terephthalate (PET), polybutylene and polyethylene naphthalate (PEN) films; polycarbonate (PC) films; polymethylmethacrylate films; polyolefin films such as polyethylene and polypropylene films; polyimide films, triacetyl cellulose (TAC) films. According to an embodiment, polyethylene terephthalate film is used as either of the first or second film or as both of the first and second films.

The first film is selected from any films, having the thickness, $d_1$, and the physical properties (Young's modulus $Y_1$ and Poisson's ratio $P_1$) so as to fulfill the condition of formula (1) in relation to the total thickness, $d_3$, of the light-reflective multilayer. The light-reflective multilayer may be designed so as to have the desired light-reflective characteristics; the necessary thickness $d_3$ may be determined; and then, the first film is selected from any films having the properties which fulfill the condition of the formula (1). The Young's modulus and Poisson's ratio of a film may be varied depending on various factors such as the main polymer ingredient thereof, the additive thereof, an amount of the additive, and the conditions in the film-forming or the stretching. By adjusting at least one of the factors, the film having the desired properties may be produced. The first or second film may be selected from any commercially available films.

The second film to become a part of the light-reflective film eventually may be required to have a certain level of the strength. For example, by forming a hard coating layer on the surface of the polymer film to be used as the second film, the strength may be improved. The materials which can be used for preparing the hard coating layer are not limited. Any materials which have been used as the material of the hard coating layer of any polymer film such as a PET film may be used.

The hard coating layer is preferably formed on the surface, which is opposite to the surface receiving the light-reflective multilayer by the transferring, of the second film.

(3) Curable Liquid Crystal Composition

In the invention, the curable liquid crystal composition to be used for forming each of the light-reflective multilayer is capable of forming a cholesteric liquid crystal phase.

One example of the curable liquid crystal composition contains at least a rod-like liquid crystal. For exhibiting the cholesteric liquid crystal phase, the composition preferably contains at least one optically-active compound (chiral agent); and for exhibiting the polymerizable properties, the composition preferably contains at least one polymerization initiator. For forming the cholesteric liquid crystal phase stably, the composition preferably contains at least one alignment-controlling agent.

Rod-like Liquid Crystal Compound:

Examples of the rod-like which can be used in the invention include nematic rod-like liquid crystal compounds. Preferable examples of the nematic rod-like liquid crystal include azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyl dioxanes, tolans and alkenylcyclohexyl benzonitriles. In the invention, the liquid crystal compound can be selected from not only low-molecular weight compounds but also high-molecular weight compounds.

The rod-like liquid crystal compound to be used in the invention may be polymerizable or not polymerizable. Examples of the rod-like liquid crystal having no polymerizable group are described in many documents such as Y. Goto et. al., Mol. Cryst. Liq. Cryst. 1995, Vol. 260, pp. 23-28.

A polymerizable rod-like liquid crystal compound may be prepared by introducing a polymerizable group in rod-liquid crystal compound. Examples of the polymerizable group include an unsaturated polymerizable group, epoxy group, and aziridinyl group; and an unsaturated polymerizable group is preferable; and an ethylene unsaturated polymerizable group is especially preferable. The polymerizable group may be introduced in a rod-like liquid crystal compound according to any method. The number of the polymerizable group in the polymerizable rod-like liquid crystal compound is preferably from 1 to 6 and more preferably from 1 to 3. Examples of the polymerizable rod-like liquid crystal compound include those described in Makromol. Chem., vol. 190, p. 2255 (1989), Advanced Materials, vol. 5, p. 107 (1993), U.S. Pat. No. 4,683,327, U.S. Pat. No. 5,622,648, U.S. Pat. No. 5,770,107, WO95/22586, WO95/24455, WO97/00600, WO98/23580, WO98/52905, JPA No. 1-272551, JPA No. 6-16616, JPA No. 7-110469, JPA No. 11-80081 and JPA No. 2001-328973. Plural types of polymerizable rod-like liquid crystal compounds may be used in combination. Using plural types of polymerizable rod-like liquid crystal compounds may contribute to lowering the alignment temperature.

Optically-Active Compound (Chiral Agent):

The liquid crystal composition is preferably capable of forming a cholesteric liquid crystal phase, and preferably contains at least one optically-active compound. However, if the rod-like liquid crystal compound having a chiral carbon in its molecule is used, some of the compositions containing such a rod-like liquid crystal compound may be capable of stably forming a cholesteric liquid crystal phase even if they don't contain any optically-active compound. The optically-active compound may be selected from any known chiral agents such as those used in twisted-nematic (TN) and super-twisted-nematic (STN) modes, which are described, for example, in "Ekisho Debaisu Handobukku (Liquid Crystal Device Handbook)", Third Chapter, 4-3 Chapter, p. 199, edited by No. 142 Committee of Japan Society for the Promotion of Science, published by the Nikkan Kogyo Shimbun, Ltd., in 1989. Although, generally, an optically-active compound has a chiral carbon in its molecule, axially chiral compounds and planar chiral compound, having no chiral carbon, may be used as a chiral compound in the invention. Examples of the axially chiral compound or the planar chiral compound include binaphthyl, helicene, paracyclophane and derivatives thereof. The optically-active compound (chiral compound) may have at least one polymerizable group. Using a polymerizable optically-active compound along with a polymerizable rod-like compound, it is possible to obtain a polymer having repeating units derived from the optically-active compound and the rod-like liquid crystal compound respectively by carrying out the polymerization thereof. In such an embodiment, the polymerizable group in the optically-active compound is preferably same as that in the rod-like liquid crystal compound. Accordingly, the polymerizable group in the optically-active compound is preferably selected from an unsaturated polymerizable group, epoxy group and aziridinyl group; and an unsaturated polymerizable group is preferable; and an ethylene unsaturated polymerizable group is especially preferable.

The optically-active compound may be selected from liquid crystal compounds.

An amount of the optically-active compound is preferably from 1 to 30% by mole with respect to an amount of the rod-like liquid crystal compound used along with it. A smaller amount of the optically-active compound is more preferable since influence thereof on liquid crystallinity may be small. Accordingly, optically-active compounds having a strong helical twisting power are preferable since they may achieve the desired helical pitch by being added in a small amount.

Examples of such an optically-active compound having a strong helical twisting power include those described in JPA 2003-287623.

Alignment Controlling Agent:

The alignment-controlling agent is preferably selected from any compounds which are distributed highly and localized at the film surface (the air-interface), and contribute to aligning rod-like liquid crystal molecules with a reduced tilt angle or in a substantially horizontal alignment state. The alignment-controlling agent may be localized at the air-interface at the time the curing reaction is completed. Examples of the alignment-control agent tending to localizing at the air-interface include compounds having at least one fluorine atom. Compound having at least one fluorine atom may have the tendency of being distributed highly and localized at the film surface (the air-interface), and may contribute to aligning rod-like liquid crystal molecules with a reduced tilt angle or in a substantially horizontal alignment state. Compounds having at least one perfluoroalkyl group are more preferable.

It is to be noted that a small amount of the alignment-control agent remains in the lower layer although the agent in the lower layer elutes and diffuses into the upper layer. Elution and diffusion of the alignment-control agent into the upper layer may occur partially, and may not occur in whole. The alignment-control agent may still exist in the lower layer, or exist at the interface between the lower and upper layers.

Preferable examples of the alignment-control agent which can be used in the invention include the compounds represented by formulas (I)-(IV). Two or more types of the compounds may be used. The compounds may contribute to aligning rod-like liquid crystal molecules with a reduced tilt angle or in the substantially horizontal alignment state.

It is to be understood that the term "horizontal alignment" in the specification means that the direction of long axis of a liquid crystalline molecule is parallel to the layer plane, wherein strict parallelness is not always necessary; and means, in this specification, that a tilt angle of the mean direction of long axes of liquid crystalline molecules with respect to the horizontal plane is smaller than 20°. The layer in which liquid crystal molecules are horizontally aligned at the air-interface may hardly suffer from alignment defects, and may have a high transparency for a visible light and have a high reflectance. On the other hand, the layer in which liquid crystal molecules are aligned with a large tilt angle may suffer from the finger-print pattern, and may have a low reflectance, high haze and diffraction characteristics, because of the misalignment between the helical axis of the cholesteric liquid crystal phase and the normal line of the layer surface.

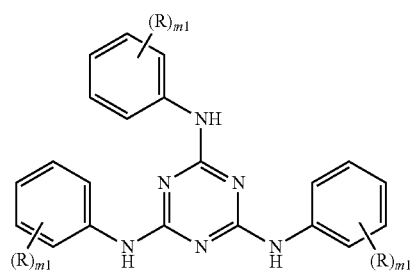

(I)

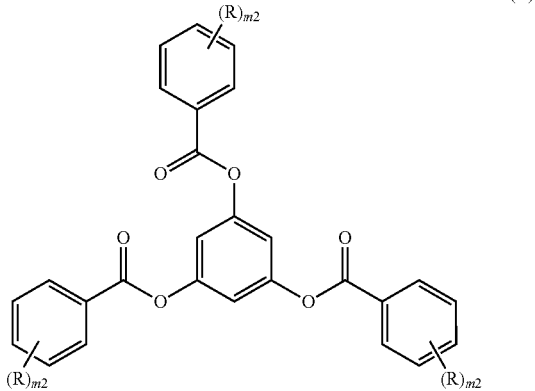

(II)

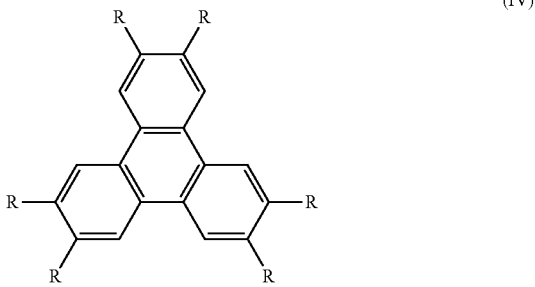

(III)

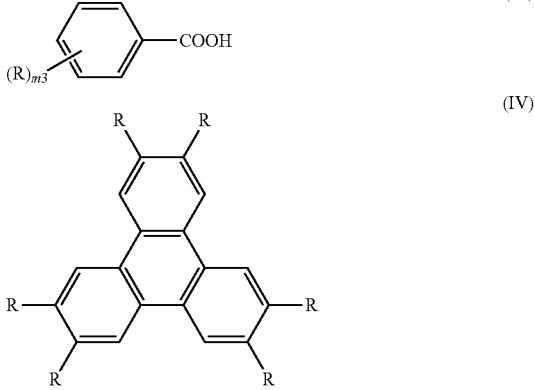

(IV)

In the formulas, a plurality of R is same or different and represents a $C_{1-30}$, preferably $C_{1-20}$, or more preferably $C_{1-15}$ alkoxy group which may be substituted with at least one fluorine atom. A $CH_2$ or two or more $CH_2$, which are not adjacent to each other, in the alkoxy group may be replaced with —O—, —S—, —OCO—, —COO—, —$NR^a$—, —$NR^a$CO—, —$CONR^a$—, —$NR^a SO_2$—, or —$SO_2 NR^a$—. $R^a$ represents a hydrogen atom or $C_{1-5}$ alkyl group. The compounds having at least one fluorine atom are preferable since they are distributed highly and localized at the air-interface, and elute and diffuse into the upper layer easily. The compounds having the terminal carbon atom having at least one fluorine atom are preferable; and the compounds having at least one perfluoroalkyl group are more preferable.

Examples of "R" include
—$OC_n H_{2n+1}$,
—$(OC_2 H_4)_{n1}(CF_2)_{n2}F$,
—$(OC_3 H_6)_{n1}(CF_2)_{n2}F$,
—$(OC_2 H_4)_{n1} NR^a SO_2 (CF_2)_{n2}F$, and
—$(OC_3 H_6)_{n1} NR^a SO_2 (CF_2)_{n2}F$.

In the formulas, n, n1 and n2 represent an integer of equal to or more than 1 respectively; n is preferably from 1 to 20, or more preferably from 5 to 15; n1 is preferably from 1 to 10, or more preferably from 1 to 5; and n2 is preferably from 1 to 10, or more preferably from 2 to 10.

In the formulas, m1, m2 and m3 represent an integer of equal to or more than 1 respectively In the formula, m1 is preferably 1 or 2, or more preferably 2. When m1 is 1, it preferably links to the para-position; and when m1 is 2, they preferably link to the para- and meta-positions.

In the formula, m2 is preferably 1 or 2, or more preferably 1. When m1 is 1, it preferably links to the para-position; and when m1 is 2, they preferably link to the para- and meta-positions.

In the formula, m3 is preferably from 1 to 3; and a plurality of R preferably links to the para-position and the two meta-positions with respect to the position of —COOH.

Examples of the compound represented by formula (I) include those described in JP-A-2005-99248, [0092]-[0093].

Examples of the compound represented by formula (II) include those described in JP-A-2002-129162, [0076]-[0078] and [0082]-[0085].

Examples of the compound represented by formula (III) include those described in JP-A-2005-99248, [0094]-[0095].

Examples of the compound represented by formula (IV) include those described in JP-A-22005-99248, [0096].

Polymerization Initiator:

The liquid crystal composition to be used for preparing each of the light-reflective layers is preferably a polymerizable liquid crystal composition; and on its own, the composition preferably contains at least one polymerization initiator. According to the invention, the polymerization may be carried out under irradiation of ultraviolet light, and the polymerization initiator is preferably selected from photo-polymerization initiators capable of initiating polymerizations by irradiation of ultraviolet light. Examples of the photo-polymerization initiator include α-carbonyl compounds (those described in U.S. Pat. Nos. 2,367,661 and 2,367,670), acyloin ethers (those described in U.S. Pat. No. 2,448,828), α-hydrocarbon-substituted aromatic acyloin compounds (those described in U.S. Pat. No. 2,722,512), polynuclear quinone compounds (those described in U.S. Pat. Nos. 3,046,127 and 2,951,758), combinations of triarylimidazole dimer and p-aminophenyl ketone (those described in U.S. Pat. No. 3,549,367), acrydine and phenazine compounds (those described in Japanese Laid-Open Patent Publication "Tokkai" No. S60-105667 and U.S. Pat. No. 4,239,850), and oxadiazole compounds (those described in U.S. Pat. No. 4,212,970).

An amount of the photo-polymerization initiator is preferably from 0.1 to 20% by mass, more preferably from 1 to 8% by mass, with respect to the liquid crystal composition (the solid content when the composition is a coating liquid).

Furthermore, the liquid crystal composition may contain at least one additive selected from any additives such as homogenous-alignment promoter, anti-unevenness agent, anti-repelling agent and polymerizable monomer for improving the uniformity of alignment, the coating property or the film hardness. If necessary, the liquid crystal composition may contain any polymerization inhibitor, antioxidant, ultraviolet absorber, light-stabilization agent, colorant, fine particles of metal oxide or the like in an amount unless the optical properties thereof are lowered.

Solvent:

The curable liquid crystal composition may be prepared as a coating liquid. Any solvents may be used. Examples of the solvent which can be used in the invention include ketones (e.g., acetone, 2-butanone, methyl isobutyl ketone and cyclohexanone), ethers (e.g., dioxane and tetrahydrofuran), aliphatic hydrocarbons (e.g., hexane), alicyclic hydrocarbons (e.g., cyclohexane), aromatic hydrocarbons (e.g., toluene and xylene), halogenated carbons (e.g., dichloro methane and dichloro ethane), esters (e.g., methyl acetate, ethyl acetate and butyl acetate), water, alcohols (e.g., ethanol, isopropanol, butanol and cyclohexanol), cellosolves (e.g., methyl cellosolve and ethyl cellosolve), cellosolve acetate, sulfoxides (e.g., dimethylsulfoxide), and amides (e.g., dimethylformamide and dimethylacetoamide). Plural types of polymerizable rod-like liquid crystal compounds may be used in combination.

Adhesion Layer:

The light-reflective film to be used in a state being attached to a windowpane has preferably an adhesion layer so as to be able to be attached to a windowpane or the like. The material of the adhesion layer is not limited. Any materials for attaching to windowpanes may be used. Examples of the material include polyvinyl butyral resins. The adhesion layer is preferably formed on the light-reflective multilayer, having four or more layers formed of a fixed cholesteric liquid crystal phase.

Other Functional Layers:

The light-reflective film produced according to the process of the invention may have other functional layer(s) along with the light-reflective multilayer. For example, the light-reflective film may have other light-reflective layer(s) employing any principle other than the selective reflectivity attributed to a cholesteric liquid crystal phase. Examples of other light-reflective layer include light-reflective layers employing an alternate laminate of a high-refractivity layer and a low-refractivity layer which are prepared by using inorganic materials such as metals and metal oxides (e.g., ITO).

Other functional layer(s) may be formed on the second film, and then, onto the layer, the light-reflective multilayer may be transferred. Other functional layer(s) may be formed on the surface of the second film, which is opposite to the surface receiving the light-reflective multilayer by transferring.

FIG. 1 is a schematic cross-sectional view of one example, which is in a state attached to a windowpane, of a light-reflective film, produced according to a process of the invention.

In FIG. 1, the light-reflective film 10 has the second film 12 such as a PET film and, thereon, the light-reflective multilayer 14 which is transferred from the first film (not shown in FIG. 1). The light-reflective multilayer 14 contains four or more layers formed of a fixed cholesteric liquid crystal phase, and the total thickness of the light-reflective multilayer 14 is equal to or more than 15 micro meters. The light-reflective multilayer 14 exhibits the selective reflectivity attributed to the cholesteric liquid crystal phase, and may have a high reflectance (e.g., 90% or higher) for light within an infrared range of from 900 nm to 1100 nm. The light-reflective film 10 has the adhesive layer 16 on the surface of the light-reflective multilayer 14 so as to be easily attached to windowpanes. The light-reflective film 10, produced according to the process of the present invention, can have a thin film as the second film 12, and exhibits a high workability when it is attached to a surface. Furthermore, the light-reflective film 10 has the hard-coating layer 18 on the rear face of the second film 12 so as to be improved in strength. By attaching the light-reflective film 10 to a windowpane, it is possible to reflect an infrared light with a high reflectance and to block sunlight and heat from the room interior.

Figure 2:
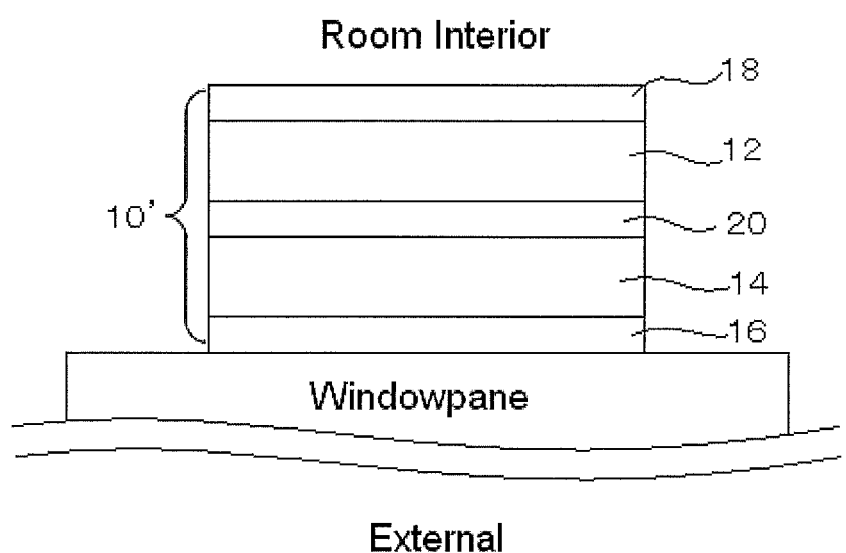
FIG. 2 is a schematic cross-sectional view of another example, which is in a state attached to a windowpane, of a light-reflective film, produced according to a process of the invention.

FIG. 2 is a schematic cross-sectional view of another example, which is in a state attached to a windowpane, of a light-reflective film, produced according to a process of the invention. It is to be noted that same members in FIG. 2 are indicated by the same number respectively, and the detailed description thereof may be omitted.

In FIG. 2, the light-reflective film 10' has the inorganic light-reflective film 20, which is formed of a metal oxide multilayer such as ITO, between the second film 12 and the light-reflective multilayer 14. The inorganic light-reflective film 20 is an alternate laminate of a high-refractivity layer and a low-refractivity layer, and exhibits the light-reflective characteristics attributed to the structure. The wavelength of the light which the inorganic light-reflective film 20 can reflect is different from the wavelength of the light which the light-reflective multilayer 14 can reflect. For example, the wavelength of the light which the inorganic light-reflective film 20 can reflect is longer than the wavelength of the light which the light-reflective multilayer 14 can reflect. Therefore, the light-reflective film 10' exhibits the light-reflective characteristic for a wider wavelength range, and better heat-shielding characteristics.

It is to be note that the same effect may be obtained by forming the inorganic light-reflective film 20 on the surface of the second film which is opposite to the surface receiving the light-reflective multilayer.

EXAMPLES

Paragraphs below will further specifically describe features of the present invention, referring to Examples and Comparative Examples. Any materials, amount of use, ratio, details of processing, procedures of processing and so forth shown in Examples may appropriately be modified without departing from the spirit of the present invention. Therefore, it is to be understood that the scope of the present invention should not be interpreted in a limited manner based on the specific examples shown below.

1. Production of Light-Reflective Film

[Preparation of Coating Liquid (Liquid Crystal Composition)]

A coating liquid having each of the formulations shown in the following table was prepared.

| Formulation of Coating Liquid (A): Light-Reflective Layer for Right-Circular Polarized Light | | |
|---|---|---|
| Materials (types) | Material Name (Manufacture) | Amount |
| Rod-Like Liquid Crystal Compound | RM-257(Merck) | 10.000 parts by mass |
| Chiral Agent | LC-756(BASF) | The amount was adjusted depending on the target reflective-wavelength. |
| Polymerization Initiator | Irg-819 (Ciba Specialty Chemicals) | 0.419 part by mass |
| Alignment-Controlling Agent | Compound 1 shown below | 0.016 part by mass |
| Solvent | 2-butanone (WAKO) | 15.652 parts by mass |

| Formulation of Coating Liquid (B): Light-Reflective Layer for Right-Circular Polarized Light | | |
|---|---|---|
| Materials (types) | Material Name (Manufacture) | Amount |
| Rod-Like Liquid Crystal Compound | RM-257(Merck) | 10.000 parts by mass |
| Chiral Agent | Compound 2 shown below | The amount was adjusted depending on the target reflective-wavelength. |
| Polymerization Initiator | Irg-819 (Ciba Specialty Chemicals) | 0.419 part by mass |
| Alignment-Controlling Agent | Compound 1 shown below | 0.016 part by mass |
| Solvent | 2-butanone (WAKO) | 15.652 parts by mass |
| $R^1$ | $R^2$ | X |
| $O(CH_2)_2O(CH_2)_2(CF_2)_6F$ | $O(CH_2)_2O(CH_2)_2(CF_2)_6F$ | NH |

Alignment controlling agent: Compound 1 (described in JP-A 2005-99248)

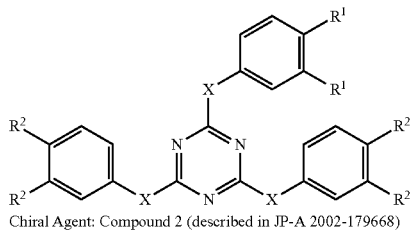

Chiral Agent: Compound 2 (described in JP-A 2002-179668)

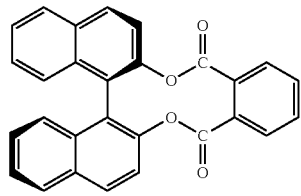

The coating liquid which was used for forming each of the layers is shown in the following table. The reflective characteristic and the peak of the reflective-wavelength are also shown in the following table.

| Layer No. | Reflective Characteristic | Coating Liquid | Peak of Reflective-Wavelength |
|---|---|---|---|
| 1 | Reflective Layer for Right-Circular Polarized Light | Coating Liquid (A) with the adjusted concentration of the chiral agent | 900 nm |
| 2 | Reflective Layer for Right-Circular Polarized Light | Coating Liquid (A) with the adjusted concentration of the chiral agent | 1030 nm |
| 3 | Reflective Layer for Right-Circular Polarized Light | Coating Liquid (A) with the adjusted concentration of the chiral agent | 1160 nm |
| 4 | Reflective Layer for Left-Circular Polarized Light | Coating Liquid (B) with the adjusted concentration of the chiral agent | 900 nm |
| 5 | Reflective Layer for Left-Circular Polarized Light | Coating Liquid (B) with the adjusted concentration of the chiral agent | 1030 nm |
| 6 | Reflective Layer for Left-Circular Polarized Light | Coating Liquid (B) with the adjusted concentration of the chiral agent | 1160 nm |

(a) Using a wire bar, each coating liquid was applied onto PET film (manufactured by FUJIFILM), a first film, shown in the following table so as to have a dry thickness of from 4 to 5 micro meters, at room temperature.

(b) This was dried at room temperature for 30 seconds to remove the solvent, and then heated in an atmosphere at 85 degrees Celsius for four minutes to form a cholesteric liquid-crystal phase.

(c) The coated layer was subjected to an irradiation of UV-light at 30 degrees Celsius using a metal halide lamp (manufactured by EYE GRAPHICS Co., Ltd.) while the output power of the lamp was adjusted, to fix the cholesteric liquid crystal phase and to form a first layer (lower layer).

(d) The first layer was cooled to the room temperature, and then the set of the steps (a)-(d) was repeated to form the second to sixth layers.

In this way, each of the samples was produced. The light-reflective multilayer of the sample was transferred onto a second film shown in the following table respectively.

2. Evaluation of Light-Reflective Film

Each of the light-reflective film samples was evaluated regarding the following items.

(1) Surface-Smoothness: the asperity of the surface was measured and the surface-smoothness was evaluated by using the measured asperity as an indicator. If the smoothness is worsened, not only the appearance such as the surface condition is worsened but also the accuracy of transferring is lowered. Furthermore, the alignment state, which results in lowering the abilities, is also influenced.

(2) Reflectance: Usually, a solar reflectance of a coated layer is calculated according to JIS R 3016:1998 (Testing method on transmittance, reflectance and emittance of flat glasses and evaluation of solar heat gain coefficient), and so, the heat-shield ability of the sample was measured according to JIS R 3016:1998. The measurement was conducted using a spectrophotometer with an integrating sphere attached unit. The reflectance for the wavelength of from 900 nm to 1160 nm is shown in the following table.

(3) Haze: If the alignment of the cholesteric liquid crystal layer is worsened, not only the reflectance is lowered but also the haze value is increased remarkably. So, the haze value of the sample was measured as an indicator showing the alignment state of the cholesteric liquid crystal layer. The haze value was measured according to JIS K 7136:2000 (Determination of haze for transparent materials).

The results are shown in the following tables.

| | Cholesteric Liquid Crystal Layer | | First Film | | | Second | Evaluation | | |
|---|---|---|---|---|---|---|---|---|---|
| | Number of Layers (Types) | Total Thickness (mm) | Thickness (mm) | Poisson's ratio | Young's modulus (N/mm2) | Value of Left Part of Formula (1) | Film Thickness (mm) | Smoothness | Reflectance *1 (%) | Haze *3 |
| Example 1 | Six Layers (No. 1-6) | 0.03 | 0.1 | 0.35 | 540 | 0.00040 | 0.05 | ○ | 93% | 0.55 (0.30) ○ |
| Example 2 | Six Layers (No. 1-6) | 0.03 | 0.075 | 0.35 | 540 | 0.00023 | 0.05 | ○ | 93% | 0.60 (0.35) ○ |
| Comparative Example 1 | Six Layers (No. 1-6) | 0.03 | 0.065 | 0.35 | 540 | 0.00017 | 0.05 | x | 83% | 0.95 (0.70) x |
| Comparative Example 2 | Four Layers (No. 1-4) | 0.03 | 0.05 | 0.35 | 540 | 0.00010 | 0.05 | x | 71% | 1.30 (1.05) x |
| Example 3 | Four Layers (No. 1-4) | 0.02 | 0.075 | 0.35 | 540 | 0.00034 | 0.05 | ○ | 92% | 0.45 (0.20) ○ |
| Example 4 | Four Layers (No. 1-4) | 0.02 | 0.06 | 0.35 | 540 | 0.00022 | 0.05 | ○ | 91% | 0.51 (0.26) ○ |
| Comparative Example 3 | Four Layers (No. 1-4) | 0.02 | 0.05 | 0.35 | 540 | 0.00015 | 0.05 | x | 83% | 0.84 (0.59) x |
| Comparative Example 4 | Four Layers (No. 1-4) | 0.02 | 30 | 0.35 | 540 | 0.00010 | 0.05 | x | 71% | 1.05 (0.80) x |
| Referential Example 5 | Two Layers (No. 1-2) | 0.008 | 0.03 | 0.35 | 540 | 0.000135 | 0.05 | ○ | 90% *2 | 0.47 (0.22) ○ |

-continued

| | Cholesteric Liquid Crystal Layer | | First Film | | | Second | Evaluation | | |
|---|---|---|---|---|---|---|---|---|---|
| | Number of Layers (Types) | Total Thickness (mm) | Thickness (mm) | Poisson's ratio | Young's modulus (N/mm2) | Value of Left Part of Formula (1) | Film Thickness (mm) | Smoothness | Reflectance *1 (%) | Haze *3 |
| Referential Example 6 | Two Layers (No. 1-2) | 0.008 | 0.05 | 0.35 | 540 | 0.000376 | 0.05 | ○ | 93% *2 | 0.41 (0.16) ○ |

*1 The reflectance for the light having a wavelength within the range of from 900 nm to 1160 nm.
*2 The reflectance for the light having a wavelength of 900 nm was measured because the reflective wavelength range was narrow. The heat-shield ability of the sample was weak.
*3 The haze value of the light-reflective film containing the second film. The value in parentheses is a haze value of only the multilayer of the cholesteric phase, "○" means that the sample had a high transparence so that it was usable as a film for a windowpane; and "x" means that the sample was whitish due to scattering (mainly inner scattering) so that it was not usable as a film for a windowpane because of the lower transparence.

From the data shown in the above tables, it can be understood that the light-reflective films, produced in the examples, had the high surface-smoothness; and any worsening of the alignment was not found in each of the sample films.

Therefore, it can be understood also that, according to the examples of the present invention, good light-reflective films, having the light-reflective characteristic for the wide infrared wavelength, in which any increase of the haze value caused by worsening the alignment was not found, were obtained. The thickness of the second film, supporting the light-reflective multilayer eventually, is 0.05 mm (50 micro meters), which may be excellent in the workability when it is used to be attached to a windowpane.

On the other hand, it can be understood that, in Comparative Example 1-4 employing the film not fulfilling the condition of the formula (1), the surface-smoothness was worsened due to the accumulation of the inner stress caused by forming the light-reflective multilayer, thereby, the alignment of each of the layers was lowered, the light-reflective characteristics were worsened, and the haze value was increased.

In Referential Examples 5 and 6, since only two layers of the cholesteric liquid crystal phase were formed, the accumulation of the inner stress was small. As a result, although the surface-smoothness was not worsened, the light-reflective wavelength range was narrow, and the heat-shield ability was weak.

What is claimed is:

1. A process for producing a light-reflective film comprising:
    (a) applying a curable liquid crystal composition to a first film having a thickness of $d_1$;
    (b) drying the applied curable liquid crystal composition to form a cholesteric liquid crystal phase;
    (c) carrying out a curing reaction of the curable liquid crystal composition and fixing the cholesteric liquid crystal phase to form a lower layer;
    (d) repeating the set of the steps (a)-(c) three or more times on the lower layer to form a light-reflective multilayer having four or more layers of a fixed cholesteric liquid crystal phase; and
    (e) transferring the light-reflective multilayer, formed on the first film, onto a second film having a thickness of $d_2$ which is smaller than $d_1$;

wherein the first film, fulfilling the condition of formula (1), is used:

$$\frac{(d_1)^2 \times (Y_1)}{(d_3) \times (1 - P_1)} \geq 0.0002 \tag{1}$$

where $d_1$ is a thickness (mm) of the first film; $Y_1$ is a Young's modulus (N/mm² at 25 degrees Celsius) of the first film; $P_1$ is a Poisson's ratio (at 25 degrees Celsius) of the first film; and $d_3$ is a total thickness (mm) of the light-reflective multilayer having four or more layers of a fixed cholesteric liquid crystal phase, where $d_3$ is equal to or more than 15 micro meters.

2. The process of claim 1, wherein the deformation of the light-reflective multilayer caused by the inner stress occurring during the curing reaction in the steps (c) and (d) are reduced by using the first film fulfilling the condition of (1).

3. The process of claim 1, wherein, in the step (e), the light-reflective multilayer is transferred onto the second film fulfilling the condition of formula (2):

$$\frac{(d_2)^2 \times (Y_2)}{(d_3) \times (1 - P_2)} < 0.0002 \tag{2}$$

where $d_2$ is a thickness (mm) of the second film; $Y_2$ is a Young's modulus (N/mm² at 25 degrees Celsius) of the second film; $P_2$ is a Poisson's ratio (at 25 degrees Celsius) of the second film; and $d_3$ is a total thickness (mm) of the light-reflective multilayer having four or more layers of a fixed cholesteric liquid crystal phase, where $d_3$ is equal to or more than 15 micro meters.

4. The process of claim 1, wherein, in the step (e), the light-reflective multilayer is transferred onto the second film having the thickness, $d_2$, of equal to or smaller than 50 micro meters.

5. The process of claim 1, wherein each of the curable liquid crystal compositions to be used in the steps (a) and (d) comprises a polymerizable rod-like liquid crystal compound, an alignment-controlling agent capable of controlling the alignment of the polymerizable rod-like liquid crystal compound, and solvent.

6. The process of claim 1, wherein, in the steps (a) and (d), each of the curable liquid crystal compositions is applied by using a wire-bar.

7. The process of claim 1, which is a process for producing a light-reflective film to be used in a state being attached to a surface.

8. The process of claim 1, wherein at least one of the first and second films is a polyethylene terephthalate film.

9. The process of claim 1, wherein, in the steps (c) and (d), at least one layer capable of reflecting a right-circular polarized light and at least one layer capable of reflecting a left-circular polarized light are formed respectively.

10. A light-reflective film produced according to a process of claim 1, comprising:
- a film having a thickness of equal to or smaller than 50 micro meters, and, thereon,
- a light-reflective multilayer, having four or more layers of a fixed cholesteric liquid crystal phase of a polymerizable liquid crystal composition, and the total thickness of the light-reflective multilayer being equal to or more than 15 micro meters.

11. The light-reflective film of claim 10, wherein the haze value of the light-reflective multilayer is less than 0.7.

12. The light-reflective film of claim 10, which is capable of reflecting 75% or more light at a wavelength of from 900 nm to 1160 nm.

* * * * *